United States Patent [19]
Dumoux et al.

[11] Patent Number: 5,524,527
[45] Date of Patent: Jun. 11, 1996

[54] APPLIANCE FOR COOKING OR FRYING FOODSTUFFS

[75] Inventors: Philippe Dumoux, Selongey; Dominique Federico, Is sur Tille; Jean-Marie Thevenin, Bourberain, all of France

[73] Assignee: SEB S. A., Selongey, France

[21] Appl. No.: 508,340

[22] Filed: Jul. 27, 1995

Related U.S. Application Data

[63] Continuation of Ser. No. 196,778, Feb. 15, 1994, abandoned.

[30]      Foreign Application Priority Data

Feb. 15, 1993 [FR]   France ................................... 93 01962

[51] Int. Cl.⁶ ............................ A47J 27/62; A47J 37/12
[52] U.S. Cl. ................................................. 99/353; 99/403
[58] Field of Search ............................ 99/403, 327, 328, 99/332, 333; 219/421, 422, 425, 427, 435, 436, 437, 438, 439, 523

[56]            References Cited

U.S. PATENT DOCUMENTS 3,159,344  12/1964  Wilson .
3,801,331  4/1974  Sano et al. ................................ 99/403
3,877,359  4/1975  Keating ..................................... 99/403
3,904,852  9/1975  Rivelli et al. .
4,103,604  8/1978  Berard ....................................... 99/403
4,995,312  2/1991  Leiros .

FOREIGN PATENT DOCUMENTS 0499062  1/1992  European Pat. Off. .
9013848  10/1090  Germany .

*Primary Examiner*—Timothy F. Simone
*Assistant Examiner*—Reginald L. Alexander
*Attorney, Agent, or Firm*—Loeb & Loeb

[57]            ABSTRACT

In an appliance for cooking or frying foodstuffs in a fluid, comprising: a cooking tank; an external housing surrounding the cooking tank, providing an external wall of the appliance and having an opening; a heating member in thermal communication with the cooking tank; pilot units for controlling operation of the appliance; and a support plate carrying at least a part of the pilot units and removably mounted in the opening in the housing to constitute a portion of the external wall of the appliance, the pilot units including a heating control unit for controlling the temperature of fluid in the cooking tank, mounted on the plate in heat exchange communication with the cooking tank.

20 Claims, 6 Drawing Sheets

5,524,527

APPLIANCE FOR COOKING OR FRYING FOODSTUFFS

This is a continuation of application Ser. No. 08/196,778 filed on Feb. 15, 1994, now abandoned.

BACKGROUND OF THE INVENTION

The present invention relates to a heating apparatus, or appliance, for cooking or frying in a fluid, such as a deep fryer for example, having a cooking container surrounded by an external skirt forming the facade of the apparatus, heating means and pilot means for controlling and monitoring the operating cycle of the apparatus.

Heating apparatus of the type mentioned above, and for example electric fryers, conventionally include a cooking container, or tank, made of metal for example, surrounded by an external skirt, or housing, which is spaced at a distance from the tank, the skirt generally being made of polypropylene. The skirt forms the facade, or external surface, of the apparatus. The heating means are conventionally constituted by at least one shielded electric heating resistor disposed beneath the bottom of the tank and in heat exchange relation therewith. Known electric fryers also include, as pilot means for their operating cycle, various indicators, such as lights, and control or regulating buttons, as well as thermal limiters or controls for the operation of the heating resistor. Thermal limiters are, for example, constituted by a thermostat which may or may not be associated with a fuse, the thermostat being adjustable through the intermediary of a button or dial disposed on the facade of the apparatus. The thermostat and the associated fuse or fuses are in general situated near the bottom of the tank.

Electric fryers designed according to the above-described principles require, in the event of a malfunction of the thermostat or melting of the safety fuse, a substantial disassembly of the apparatus to permit replacement of defective parts and/or the safety fuse. Such a repair operation is of course difficult and time consuming and constitutes a disadvantage which is linked to the very design of the apparatus. Moreover, the installation in the body of the fryer of the totality of the electric wiring connected to the thermal limiters and to the various means for controlling and monitoring the operating cycle of the apparatus equally constitute a drawback linked to the design of the apparatus. It is also in order to note that assembly of such fryers requires a conveyance of the fryer on assembly lines, which constitutes a drawback on the industrial level.

It is also known, as disclosed in U.S. Pat. No. 3,904,852, to arrange, in a removable manner in the housing of a cooking system, pilot means, i.e. monitoring and control means, and in particular a computer module connected to a sensor, or probe, disposed at the interior of the cooking tank. Such a design does not permit temperature increases within the cooking tank to be monitored in a simple manner.

SUMMARY OF THE INVENTION

A primary object of the invention is to overcome or diminish the above-described drawbacks and difficulties.

A more specific object of the invention is to simplify the assembly of such heating apparatus.

Another specific object of the invention is to provide a novel heating apparatus having control and monitoring means which are more readily accessible for adjustment and replacement purposes.

Yet another object of the invention is to provide a novel heating apparatus in which access to the various control and monitoring means is facilitated without interfering with the operation of thermal regulation elements, while allowing for conventional manufacturing tolerances.

Yet another object of the invention is to provide a novel heating apparatus whose constituent components can be assembled in a simple and improved manner.

These and other objects of the invention are achieved by an appliance for cooking or frying foodstuffs in a fluid, comprising: a cooking tank; an external housing surrounding the cooking tank, providing an external wall of the appliance and having an opening; heating means in thermal communication with the cooking tank; pilot means for controlling and/or monitoring operation of the appliance; and support means including a support plate carrying at least a part of the pilot means and removably mounted in the opening in the housing to constitute a portion of the external wall of the appliance, wherein the pilot means comprise heating control means for controlling the temperature of fluid in the cooking tank, the heating control means being mounted on the plate in heat exchange communication with the cooking tank.

Other features and advantages of the invention will become more readily apparent from the description to be presented below with reference to the attached drawings, illustrating an exemplary embodiment of the invention. It is to be understood that the invention is not limited to the illustrated embodiment.

DESCRIPTION OF THE PREFERRED EMBODIMENTS

Figure 6:
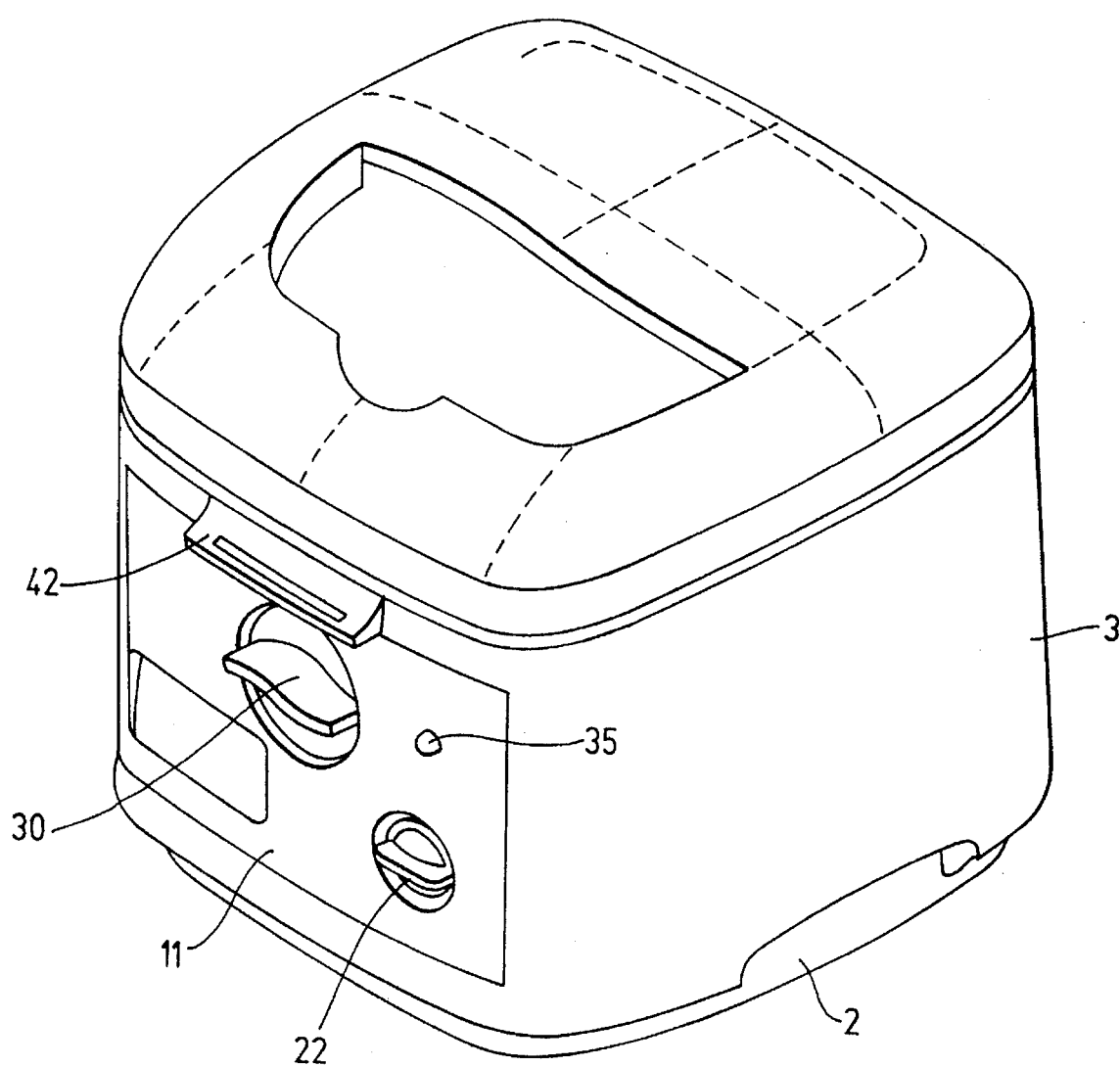
FIG. 6 is a perspective view showing the exterior of a fryer according to the invention.

FIG. 6 is a perspective view showing the exterior of a fryer constituting an exemplary and non-limiting embodiment of the invention. The fryer includes an external housing composed of a base 2 and an external peripheral skirt 3, as well as a removable lid. Skirt 3 is provided with a cutout 10, here shown to be rectangular, which receives a support plate 11. Plate 11 carries, inter alia, a knob, or dial, 30 for controlling raising and lowering of a fryer basket (FIG. 3), a knob, or dial, 22 for controlling a thermostat (FIG. 2) and an indicator light which can be seen via an opening 35. Skirt 3 carries a latch element 42, which will be described below, for allowing removal of plate 11.

Figure 1:
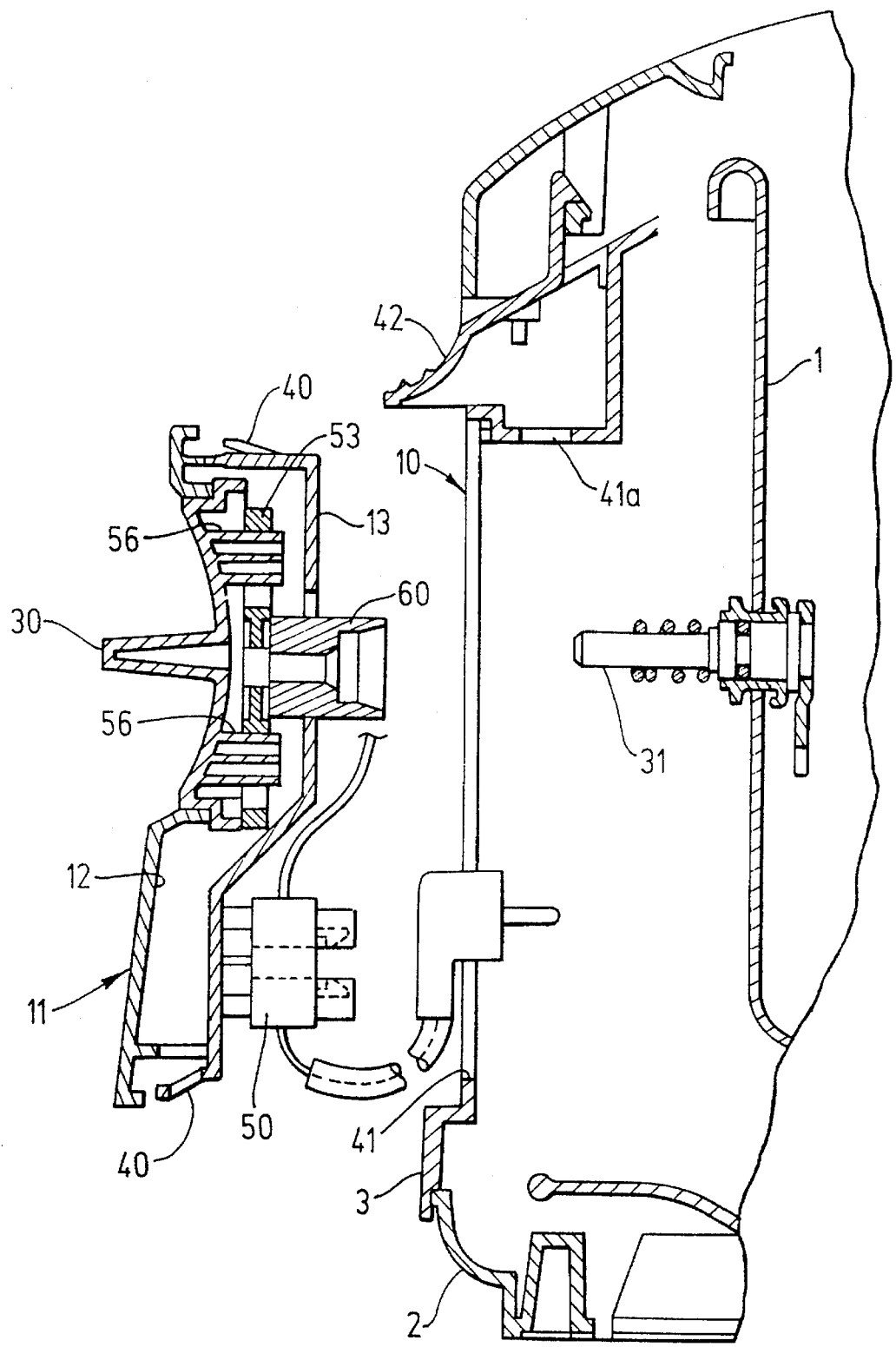
FIG. 1 is an elevational cross-sectional detail view of a support plate mounted in an external skirt of a deep fat fryer according to the invention.

FIG. 1 shows, in an elevational, cross-sectional detail view, one embodiment of a heating or cooking apparatus according to the invention, such as THE electric fryer of FIG. 6, which includes a cooking container, or tank, 1 which will contain a mass of a fluid, typically oil, in which foodstuffs can be fried. Tank 1 is mounted by any suitable means in the housing, or receptacle, formed of base 2 surmounted by a plastic shell, for example of polypropylene, which forms an external skirt 3 constituting a facade for the fryer. Tank 1 is fixed by any appropriate means in the shell and is surrounded by, and spaced from, skirt 3. In a conventional manner, the fryer shown in FIGS. 1–3 includes heating means 4 constituted for example by a jacketed resistor 5 fastened to the bottom 6 of tank 1.

The apparatus according to the invention includes in its facade constituted by skirt 3, the cutout 10 which is, in this example, substantially rectangular. Cutout 10 opens into the space between skirt 3 and the wall of tank 1. Cutout 10 is intended to receive support plate 11 having a form matching the outline of cutout 10, so that plate 11 constitutes an element of the fryer facade. Advantageously, support plate 11 is fixed, via its internal face 12, to a plate 13 covering substantially the entire surface of face 12 to constitute an assembly comparable to a housing. Plate 13 is fixed on support plate 11 by any appropriate means, for example by screws.

Support plate 11 is mounted in a removable manner in cutout 10 and is intended to support at least one part of the pilot means necessary for controlling and monitoring the operating cycles of the fryer. Reference herein to control and monitoring means encompasses the totality of all means necessary for enabling the fryer to complete any desired cooking or frying cycle, whether this involves monitoring, control and regulation of temperature variation, or elements for turning the fryer on and off, or even monitoring elements in general or in particular for monitoring the duration of a cycle of operation, or even components for monitoring the position of a fryer basket or the condition of the cooking fluid. Of course, the above list of means and devices is not limiting.

Preferably, monitoring and control means on support plate 11 include, as thermal regulation elements, at least one thermostat 15 (FIG. 2) of a conventional type, and for example of the type composed of bimetal blades. Thermostat 15 is fixed at one end to a support 16 defining a hollow, or recess, 17. At the interior of recess 17 there is located a fastening pin 18 constructed to engage in an orifice, or passage, of plate 13. Thermostat 15 is fixed on plate 13 by the intermediary of attachment clips (not shown in the drawings), or by any other equivalent attachment means, and is advantageously mounted to be elastically movable relative to plate 13 along the axis of fastening pin 18 extending in a direction substantially perpendicular to the wall of tank 1. Elastic mounting of thermostat 15 is advantageously achieved by interposition of a compression spring 19, concentric with fastening pin 18, between recess 17 and the face of plate 13 which is directed toward the wall of tank 1.

Thermostat 15 also includes, preferably in the region opposite to fastening pin 18, a contact piece 20 having a hemispherical contact end. Piece 20 is advantageously made of aluminum and is formed to assure an optimal thermal contact between the wall of tank 1 and thermostat 15. Use of a piece such as piece 20 minimizes difficulties due to dimensional variations in the various component parts.

The dimensions of thermostat 15 as well as the elasticity of compression spring 19 are such that they assure, upon installation of support plate 11 in cutout 10, an optimal elastic contact between piece 20 and the wall of tank 1, capable of correcting for any play due to fabrication tolerances. Thermostat 15 is provided in a conventional manner with a shaft 21 which is rotatable to adjust the temperature setting of thermostat 15. Shaft 21 is coupled, through an opening provided in plate 13, to control button, or dial, 22 supported by support plate 11 and essentially integrated into the facade formed by support plate 11. The temperature to which thermostat 15 is to respond can be set by rotating dial 22.

Figure 2:
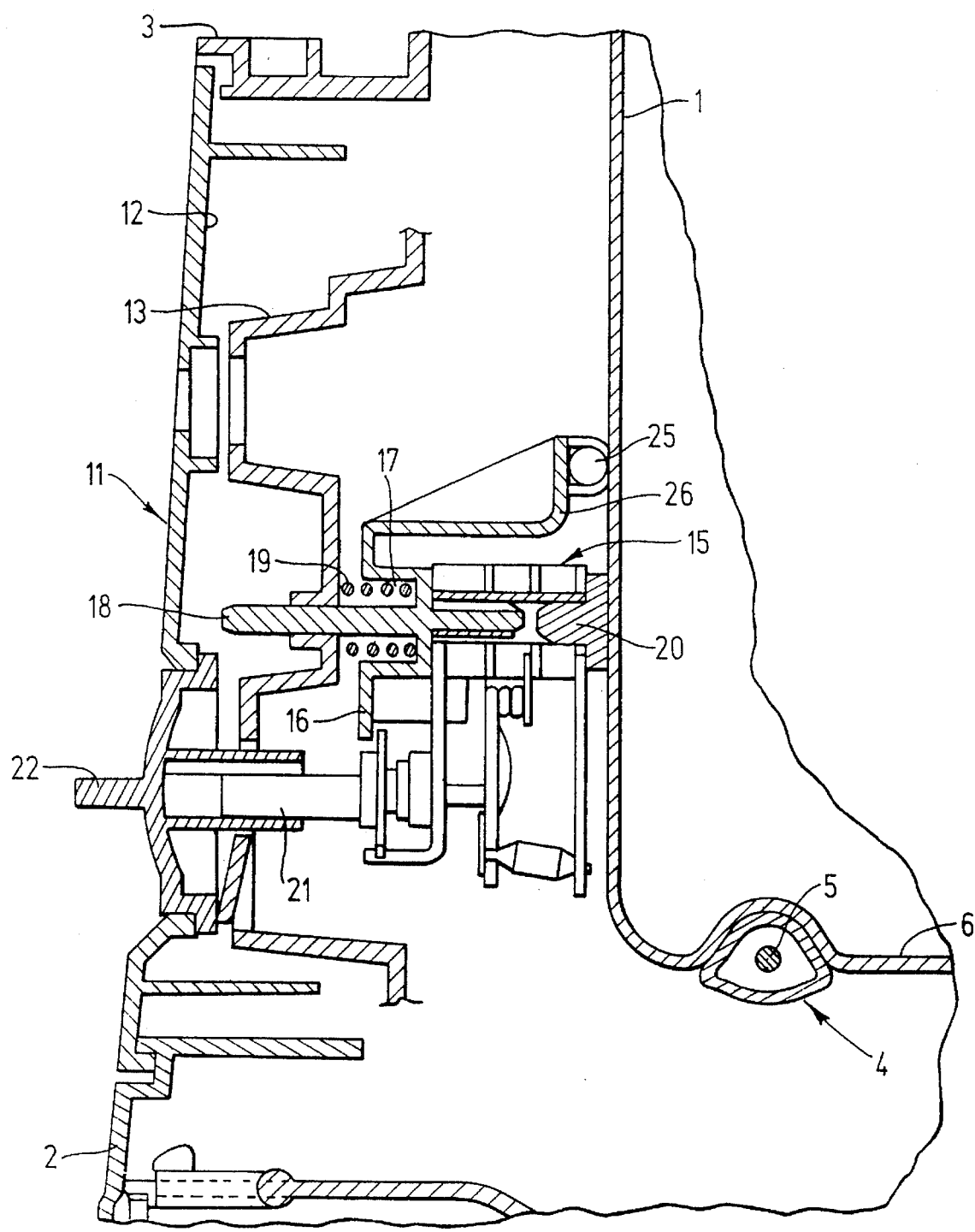
FIG. 2 is an elevational cross-sectional detail view in another plane of a support plate according to the invention integrated into a facade of a fryer.
Figure 3:
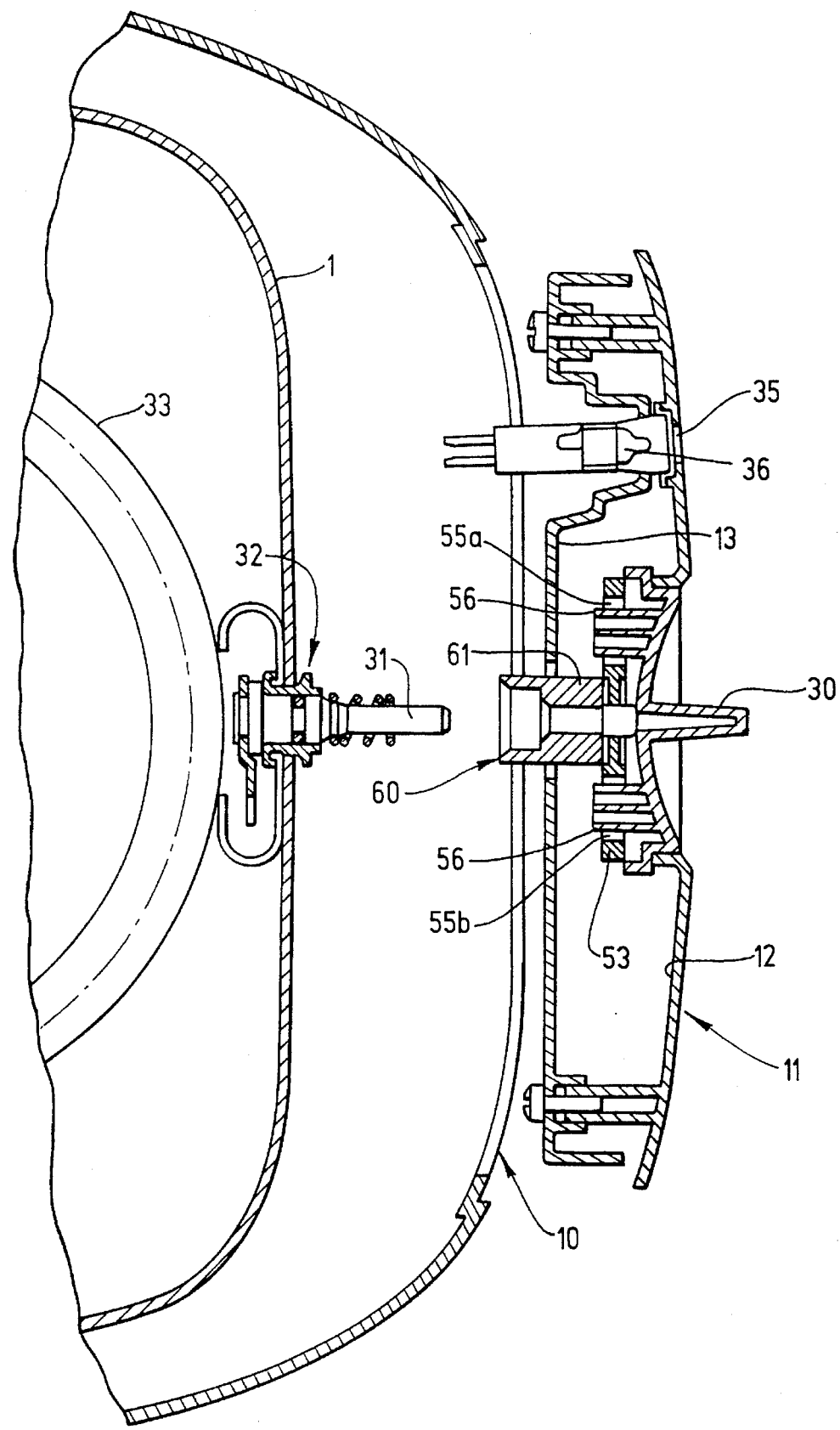
FIG. 3 is a cross-sectional plan detail view of an embodiment of a support plate according to the invention in a facade of a fryer.

According to alternative embodiments of the invention, it is possible to mount other thermal regulation elements on plate 13 or on support plate 11 in a manner to be in heat exchange relation with tank 1 when support plate 11 is in place in cutout 10. Thus, as an example of such modifications, it is possible to mount, as shown in FIG. 2 for example, at least one meltable fuse 25 supported by plate 13. Fuse 25 can be mounted through the intermediary of a foot 26 on support 16 of thermostat 15. According to another modification (not shown in the drawings), fuse 25 can be mounted in an independent manner directly on plate 13 through the intermediary of a mounting body fixed on plate 13. Fuse 25 can also be embedded in an attachment body coming from the molding of plate 13. Preferably, regardless of the type of mounting envisioned, fuse 25 is mounted to be elastically movable on plate 13 in a direction substantially perpendicular to the wall of tank 1 so as to be reliably maintained in thermal contact with tank 1 when support plate 11 is in place. The thermal regulation elements are thus mounted for example, at least in part on support plate 11 by the intermediary of plate 13.

The elements for controlling, regulating and monitoring operating cycles of the fryer can also be advantageously integrated into support plate 11, at the facade thereof, in a manner to be able to be directly acted upon by the user. For this purpose, support plate 11 includes control button, knob, or dial, 30 having a portion which extends through an opening provided in plate 13 and which is fixed to a control shaft 31 of a system 32 for raising and lowering a perforated basket 33 which is placed in tank 1 to hold foodstuffs which are being fried. System 32 can be constructed in the manner disclosed in French Patent No. A-1517736.

Support plate 11 can also include on its external face the opening 35 (FIG. 3) associated with an indicator light 36 serving to monitor operation of the fryer. Secondarily, support plate 11 can also include an on-off switch for the apparatus (not shown in the figures).

Support plate 11 and the housing containing all or some of the control and monitoring means is intended to be integrated in a removable manner in cutout 10 so as to permit those means to be installed and removed easily. For this purpose, the attachment system can include a series of retaining tongues 40, preferably fixed to plate 13 (FIGS. 1 and 3) intended to engage with cooperating surfaces or wall portions 41 provided on skirt 3. In order to facilitate withdrawal of support plate 11 when tongues 40 are engaging surfaces 41, it is possible to provide retaining openings such as 41a (FIG. 1) in an access chamber formed in latch, or bolt, element 42. Element 42 is mounted to be movable on skirt 3 so as to permit element 42 to be moved to an open position, after which access can be gained to at least one side of support plate 11 in order to extract support plate 11 easily. According to another modification, it is possible to assure removability of support plate 11 by mounting support plate 11 by means of a hinge on one side of cutout 10 in order to allow support plate 11 to be pivotal (not shown in the figures).

Plate 13 also includes lugs for fixing an electrical connector 50 and is provided with a series of gripping means constructed to firmly maintain associated electric connecting wires in place.

Figure 4:
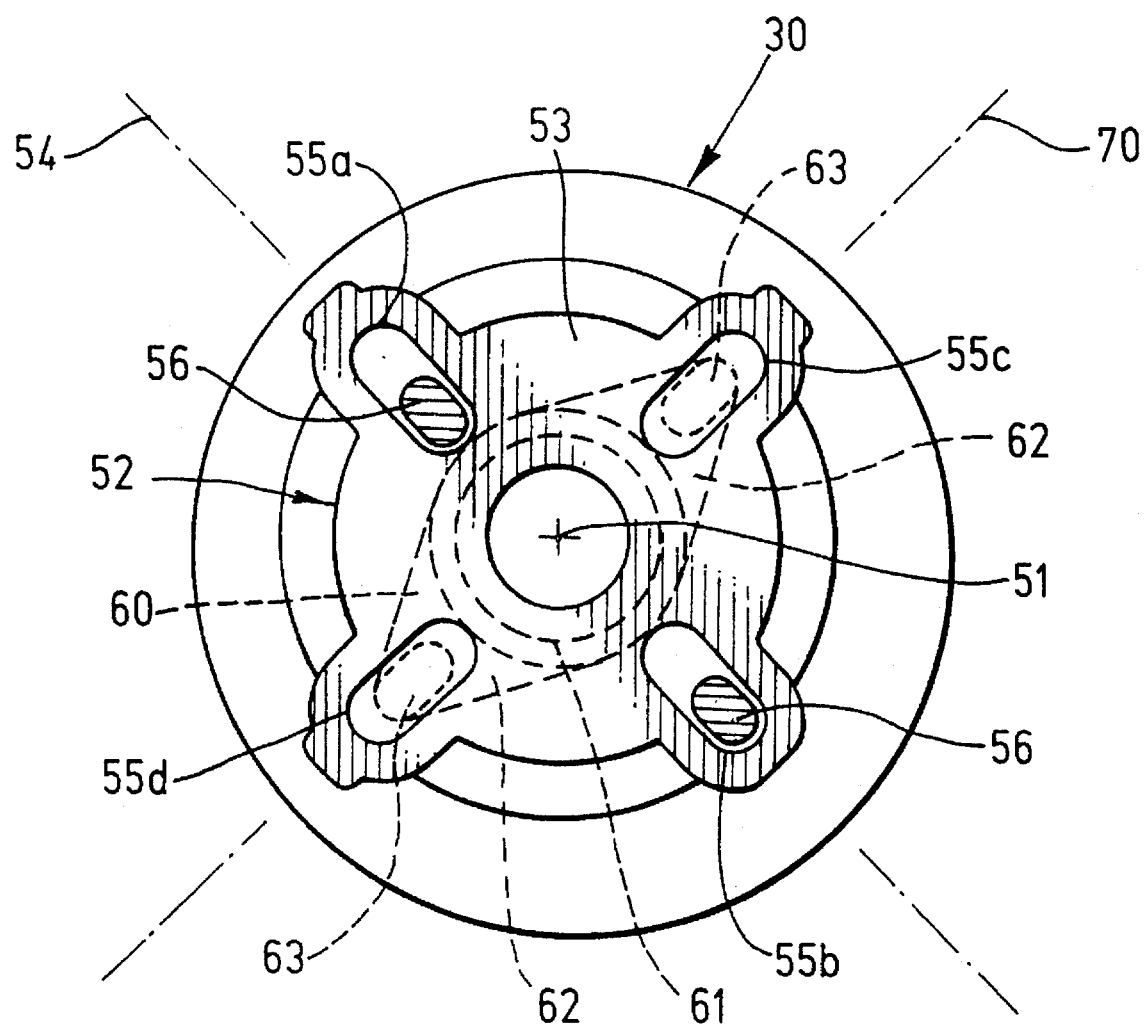
FIG. 4 is a detail view of an embodiment of a control knob, or dial, according to the invention.
Figure 5:
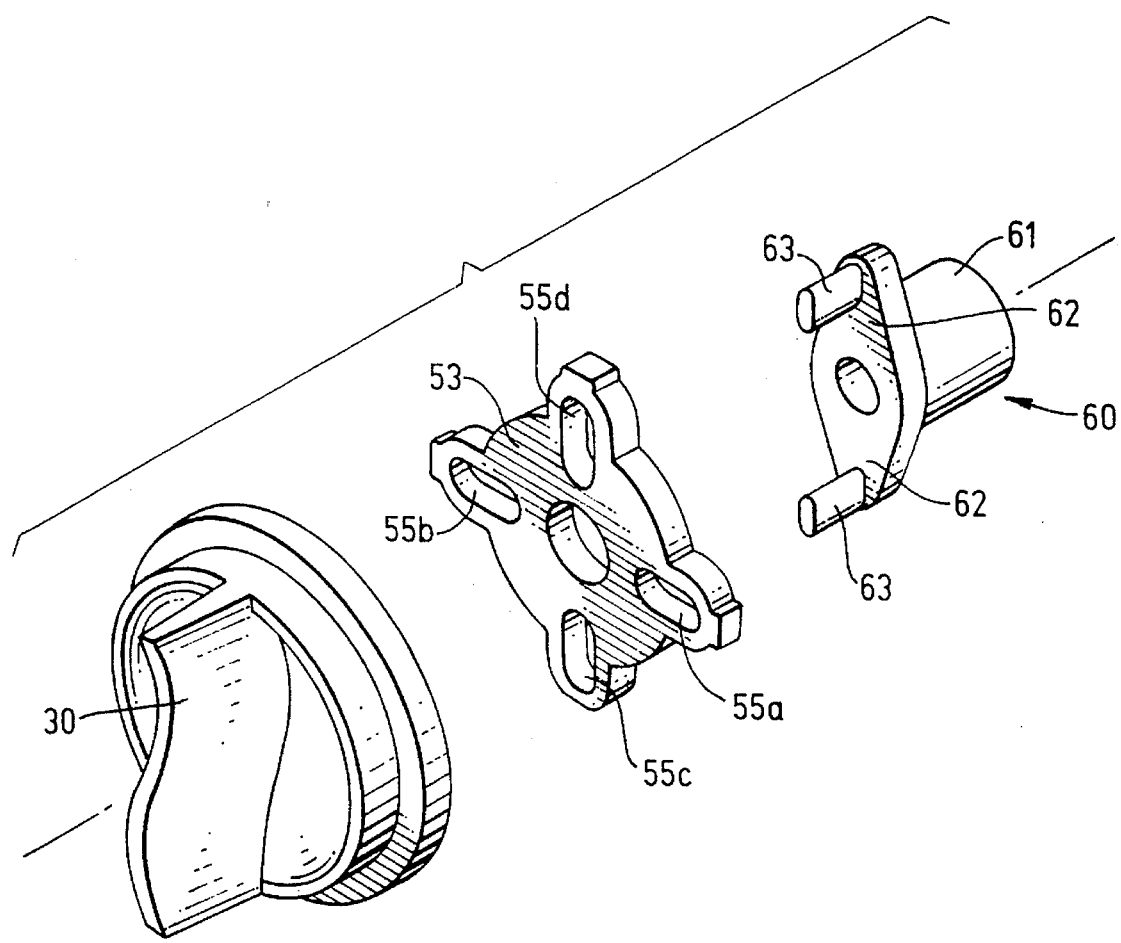
FIG. 5 is an exploded perspective view of the mechanism shown in FIG. 4.

FIG. 4 is a detail view and FIG. 5 is an exploded perspective view of a particularly advantageous form of construction of an element according to the invention, providing freedom from the disadvantages of fabrication tolerances and facilitating assembly, connection of control knob 30 to control shaft 31 of system 32 to raise and lower basket 33. The compensation for possible inaccuracy in the alignment between control shaft 31 and the driving axis of rotation 51 of control knob 30 is obtained with the aid of an alignment compensation system 52. System 52 includes an adjustment disc 53 movably mounted with a limited displacement range on control knob 30. Control knob 30 itself is supported by plate 11 to rotate about an axis which is fixed relative to plate 11.

Displacement of disc 53 can be effected along a first adjustment axis 54 perpendicular to axis 51. Disc 53 includes two elongated openings, or slots, 55a and 55b extending along axis 54 and forming a first pair of eyelets which are diametrically opposite one another with respect to the center of disc 53. Disc 53 is movably mounted on control knob 30 via openings 55a and 55b which come to engage two pins 56 (not visible in FIG. 4) fixed to an annular plate forming part of knob 30. Pins 56 have a cross section smaller than that of openings 55a and 55b. Due to this assembly, disc 53 is movable in two senses along the direction defined by first adjustment axis 54.

System 52 also includes a sleeve 60 which effects coupling between control knob 30 and control shaft 31 for control of system 32 for raising and lowering basket 33. Sleeve 60 is connected to disc 53 and includes an extremity 61 intended to be secured to control shaft 31 and two lateral arms 62 each provided with a lug 63 at its outer extremity.

Lugs 63 are intended to be inserted into slots 55c and 55d formed in disc 52 and provide the connection between sleeve 60 and disc 53. Lugs 63 are dimensioned to slide in slots 55c and 55d over a path of limited length in the direction of a second linear adjustment path, or axis, 70. Sleeve 60 is thus mounted to have a limited range of movement relative to disc 53 in both senses along axis 70. Axis 70 is perpendicular to axis 54 and to axis 51. The four slots 55a, 55b, 55c and 55d are thus angularly offset from one another with a mutual spacing of 90°.

The combination of two adjustment axes 54 and 70 provides a compensating play which enables the center axis 51 associated with sleeve 60 to move relative to knob 30 in all directions in the plane of disc 53. The area of this compensating play is circumscribed by a circle. It is thus possible to compensate for differences in alignment between the axis of rotation of button, or knob, 30 and the axis or rotation of control shaft 31 of basket raising and lower system 32. Since disc 53 is free to slide with respect to pins 56 and sleeve 60 is free to slide with respect to slots 55c and 55d, axis of rotation 51 can remain aligned with the axis of rotation of shaft 31, even if axis 51 is offset from the geometric center axis of knob 30.

Support plate 11, or preferably the pilot means housing formed by the totality of support plate 11 and plate 13, thus constitute a subassembly in which the principal components of the pilot means of a cooking appliance, such as a fryer, can be assembled in a simple manner. In the same manner, access for the purpose of disassembly, repair or adjustment of the pilot means is facilitated because it is no longer necessary to manipulate or disassemble a substantial portion of the appliance in order to gain access to essential elements such as the thermostat or the electric cables. It suffices, in effect, to remove totally or partially support plate 11 from opening 10 in order to be able to immediately access, and possibly replace, all or part of the pilot means. Such an objective is achieved without any significant modification of the appearance of the appliance since support plate 11 can be perfectly integrated into the facade of the appliance.

This application relates to subject matter disclosed in French Application number 9301962, filed on Feb. 15, 1993, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. An appliance for cooking or frying foodstuffs in a fluid, comprising: a cooking tank; an external housing surrounding said cooking tank, providing an external wall of the appliance and having an opening; heating means in thermal communication with said cooking tank; pilot means for controlling operation of the appliance; and support means including a support plate carrying at least a part of said pilot means and removably mounted in said opening in said housing to constitute a portion of the external wall of the appliance, wherein said pilot means comprise heating control means for controlling the temperature of fluid in said cooking tank, said heating control means being mounted on said plate and being in heat exchange communication with said cooking tank, and wherein said heating control means include temperature monitoring means located outside of said cooking tank and having at least one element which is in contact with said cooking tank.

2. An appliance as defined in claim 1 wherein said support means further comprise a second plate secured to said support plate and spaced from said support plate to constitute a housing for at least a part of said pilot means, said second plate being disposed between said support plate and said cooking tank when said support plate is mounted in said opening.

3. An appliance as defined in claim 1 wherein said heating control means are constituted by a thermostat.

4. An appliance as defined in claim 1 wherein said element is made of aluminum.

5. An appliance as defined in claim 1 wherein said pilot means include, in addition to said heating control means, an adjustment unit and a monitoring unit which are accessible to a user via an exterior surface of said support plate.

6. An appliance as defined in claim 5 further comprising a basket insertable to a selected position in said cooking tank, and wherein said adjustment unit is operative to adjust the position of said basket in said cooking vat and comprises a manually operable control element for placing said basket at the selected position.

7. An appliance as defined in claim 5 wherein said heating control means comprise a thermostat including a temperature selecting dial, and said monitoring unit comprises a signal lamp.

8. An appliance as defined in claim 7 wherein said pilot means further comprise a timer and a power switch.

9. An appliance as defined in claim 1 constituting a fryer.

10. An appliance as defined in claim 1 wherein said external housing is spaced from said cooking tank.

11. An appliance as defined in claim 10 wherein said temperature monitoring means are located entirely between said external housing and said cooking tank.

12. An appliance as defined in claim 1 wherein said opening is a cutout in said wall, which cutout is completely surrounded by portions of said wall.

13. An appliance as defined in claim 1 wherein said support plate is removably secured in said opening and constitutes a portion of the external wall of the appliance.

14. An appliance as defined in claim 1 wherein said at least one element is in physical contact with said cooking tank.

15. An appliance for cooking or frying foodstuffs in a fluid, comprising: a cooking tank; an external housing surrounding said cooking tank, providing an external wall of the appliance and having an opening; heating means in thermal communication with said cooking tank; pilot means for controlling operation of the appliance; and support means including a support plate carrying at least a part of said pilot means and removably mounted in said opening in said housing to constitute a portion of the external wall of the appliance, wherein said pilot means comprise heating control means for controlling the temperature of fluid in said cooking tank, said heating control means being mounted on said plate and being in heat exchange communication with said cooking tank, wherein said cooking tank has a side wall and said heating control means comprise a heat transfer element and means for elastically urging said heat transfer element in a direction perpendicular to said side wall to maintain said heat transfer element in contact with said side wall when said support means are mounted in said opening.

16. An appliance for cooking or frying foodstuffs in a fluid, comprising: a cooking tank; an external housing surrounding said cooking tank, providing an external wall of the appliance and having an opening; heating means in thermal communication with said cooking tank; pilot means for controlling operation of the appliance; and support means including a support plate carrying at least a part of said pilot means and removably mounted in said opening in said housing to constitute a portion of the external wall of the appliance, wherein said pilot means comprise heating control means for controlling the temperature of fluid in said cooking tank, said heating control means being mounted on said plate and being in heat exchange communication with said cooking tank, wherein said support means further comprise a latch element and said external housing has a latch receptacle for engaging said latch element for removably retaining said support means in said opening.

17. An appliance for cooking or frying foodstuffs in a fluid, comprising: a cooking tank; an external housing surrounding said cooking tank, providing an external wall of the appliance and having an opening; heating means in thermal communication with said cooking tank; pilot means for controlling operation of the appliance; and support means including a support plate carrying at least a part of said pilot means and removably mounted in said opening in said housing to constitute a portion of the external wall of the appliance, wherein said pilot means comprise heating control means for controlling the temperature of fluid in said cooking tank, said heating control means being mounted on said plate and being in heat exchange communication with said cooking tank, wherein said cooking tank has a side wall and said heating control means comprise a fuse and means for elastically urging said fuse in a direction perpendicular to said side wall to maintain said fuse in contact with said side wall when said support means are mounted in said opening.

18. An appliance for cooking or frying foodstuffs in a fluid, comprising: a cooking tank; an external housing surrounding said cooking tank, providing an external wall of the appliance and having an opening; heating means in thermal communication with said cooking tank; pilot means for controlling operation of the appliance; support means including a support plate carrying at least a part of said pilot means and removably mounted in said opening in said housing to constitute a portion of the external wall of the appliance, wherein said pilot means comprise heating control means for controlling the temperature of fluid in said cooking tank, said heating control means being mounted on said plate and being in heat exchange communication with said cooking tank; and a basket insertable to a selected position in said cooking tank, and wherein said adjustment unit is operative to adjust the position of said basket in said cooking vat and comprises a manually operable control element for placing said basket at the selected position, said pilot means include, in addition to said heating control means, an adjustment unit and a monitoring unit which are accessible to a user via an exterior surface of said support plate, said control element comprises a knob rotatable about a first axis, and said adjustment unit further comprises: a positioning mechanism for raising and lowering said basket, said mechanism having a drive part which is rotatable about a second axis and is coupled to said knob when said support means are mounted in said opening; and an alignment compensation device operable for compensating for misalignment between said first axis with said second axis.

19. An appliance as defined in claim 18 wherein:
said alignment compensation device comprises an adjustment disc mounted on said knob for rotation with said knob with a limited freedom of movement relative to said knob in a first direction perpendicular to said first axis, and a connection sleeve for coupling said control element to said drive part, said connection sleeve being mounted on said adjustment disc for rotation with said adjustment disc with a limited freedom of movement in a second linear direction perpendicular to both said first linear direction and said first axis.

20. An appliance as defined in claim 19 wherein:
said adjustment disc is formed to have a first pair of slots disposed diametrically opposite one another with respect to said first axis and centered on a line in the first linear direction, and a second pair of slots disposed diametrically opposite one another with respect to said first axis and centered on a line in the second linear direction; said knob has two projecting elements each slidably engaging in a respective slot of said first pair of slots; and said connection sleeve has two projecting elements each slidably engaging in a respective slot of said second pair of slots.

* * * * *